April 9, 1935.   W. J. O'LEARY   1,997,550
LAMINATED CORE FOR ELECTRICAL APPARATUS
Filed May 16, 1934

William J. O'Leary
INVENTOR

Patented Apr. 9, 1935

1,997,550

UNITED STATES PATENT OFFICE 1,997,550

LAMINATED CORE FOR ELECTRICAL APPARATUS

William J. O'Leary, Montreal, Quebec, Canada, assignor to Lucy B. O'Leary, Montreal, Quebec, Canada Application May 16, 1934, Serial No. 725,898

13 Claims. (Cl. 175—356)

The present invention relates broadly to electrical apparatus and more especially to laminated cores for transformers, magnets, motors, and other electrical apparatus where laminated magnetizable parts are a desirable feature.

One of the reasons for using a laminated core in electrical apparatus, particularly apparatus for use with an oscillating or alternating current is the prevention of eddy currents which produce electrical losses and heating of the core. A laminated core built up of unpolished sheets of iron or iron alloy results in a body comprising plates sufficiently insulated from one another to prevent the flow of the weak eddy currents in one plate from continuing through to another plate and so on through the mass. This insulation is probably due to the film of oxidation which normally occurs on ordinary commercial sheets of iron or iron alloys which are used in their normal unpolished condition. It is necessary to securely lock the plates together in order to prevent singing or vibration of the plates under the influence of the magnetic surges set up by the oscillating currents when such cores are in use.

The common practice in locking the plates together is to punch or drill holes through the plates and pass fastening members through these holes. The holes through the plates leave bright unoxidized metal comprising the walls of the holes, and in order to prevent short-circuiting of the plates, because of these bright surfaces, the usual practice has been to surround the fastening members or rivets with a tube of insulating material, usually rubber or fibre, and to place washers of rubber or fibre beneath the ends of the rivets or bolts. This construction is expensive, requires careful assembly, and necessarily increases the size of the openings beyond a size necessary for the strength of a suitable fastener.

The present invention overcomes the difficulties of the known art by providing a fastener comprising a metal member having its surface treated with a non-conducting material which is not destroyed by the application of the fastener to the laminated sheets.

The preferred form of the invention comprises the utilization of iron or iron alloy tubes of the proper length, which are thoroughly oxidized on their surface with the oxide of such a character as to permit the ends of the tubes to be expanded by swaging, spinning, riveting or other means in such manner that the tubes become hollow rivets which lock the laminations tightly together. These hollow tubes may be provided with an open seam which permits the ends to be riveted without undue stretching of the metal, and preferably the tubes are "treated" by a process known in the art as "parkerizing", which is the treatment of iron or iron alloy by chemicals to produce an oxidized surface that very tightly adheres to the metal. This may be accomplished by dipping the tubes or other fasteners into a hot phosphoric acid solution of manganese phosphate, or a solution of acid meta-phosphate of tungsten, molybdenum or the like to produce phosphates of iron on the surface of the tube or fastener. This process is in general commercial use and as specified above is known as "parkerizing". The commercial use of these fastener tubes in electric motor cases for the purpose specified, has demonstrated conclusively that such tubes when used as fastening members for laminated cores may be tightly riveted in place without destroying the insulating coating and these tubes have proved in commercial use to be a complete solution for the difficulties above outlined in the prior art. The tube is preferably provided with a head on one end, the head at the other end being formed after insertion.

The use of these tubes as fasteners permits the quick, rapid assembly of laminated cores without extraordinary care and by the use of machine operations which avoid the careful manual assembly required where the washers and insulating tubes were utilized for this purpose in the prior art. These fasteners can be manufactured much more cheaply than eyelets or similar devices and will ordinarily serve the same purpose, and can be riveted with the application of less force. They can be used for any other purpose for which they are adaptable, and the present invention is therefore not limited to their use with laminated cores.

Realizing that the present methods and structures may be carried out and produced by methods and constructions other than those herewith specifically disclosed, the disclosure herewith is to be understood as being illustrative and not in the limiting sense.

Figure 1:
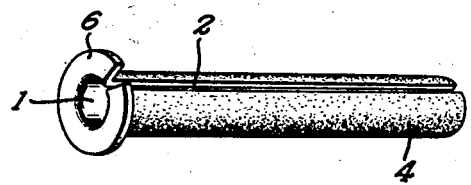
Fig. 1 is a perspective view illustrating a tube in accordance with the present invention ready to be assembled in a suitable laminated structure.

Referring now more especially to the drawing, Fig. 1 illustrates a tube of the preferred form comprising a cylindrical tubular member, one having a head at 1, an open seam 2 and with the surface 4 thereof comprising a "parkerized" surface.

Figure 2:
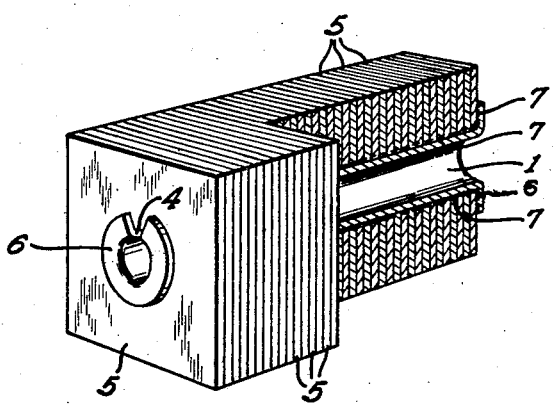
Fig. 2 is a perspective view illustrating such tube in place as a securing member for a laminated structure.

Fig. 2 illustrates a laminated structure showing a portion of the structure in section and with the tube in place. This structure comprises laminations 5 which are provided with an opening through which the tube 6 extends and with the ends of the tube 6 being tightly riveted over the end laminations in such manner as to lock the structure tightly together.

The "parkerized" surface on the tube is indicated in Fig. 2 by the dotted lines 7.

While iron or iron alloys are referred to in connection with the laminations, it is to be understood that any material may be utilized for the sheets comprising the laminations. It is also to be understood that the present invention in its primary concept comprises the separation of the fastening members from the laminated sheets by means of an insulating material comprising a chemical compound of the metal of which the fasteners are composed. More specifically, the present invention contemplates a "parkerized" surface between the fastening member and the laminations comprising the core. While the tubes are referred to as the preferred embodiment of the present invention, it is to be understood that the invention includes any other type of fastener whether screw threaded or riveted or attached by other securing means, such as pins or the like.

Having thus described my invention, I hereby claim:

1. An article of manufacture comprising a rivet formed of a metal tube with a head formed on one end and provided with a rust-proof insulating coating having a molecular attachment to the said rivet.

2. An article of manufacture comprising a rivet in the form of a split metal tube with a head thereon covered with a rust-proof insulating coating having a molecular attachment to the said rivet.

3. An article of manufacture comprising a rivet consisting of a magnetizable metal tube with a head thereon covered with a rust-proof insulated coating having a molecular attachment to the said rivet.

4. An article of manufacture comprising a fastener for laminated cores of electrical apparatus, said fastener comprising a magnetizable metallic member provided with a rust-proof insulating coating having a molecular attachment to the fastener.

5. As an article of manufacture, a fastener for laminated cores of electrical apparatus, said fastener comprising a metallic body portion with a rust-proof and insulating surface adapted to insulate said fastener from the laminations.

6. As an article of manufacture, a fastener for laminated cores of electrical apparatus, said fastener comprising a magnetizable metal body coated with a metallic rust-proofing and insulating layer adapted to insulate said member from the laminations.

7. As an article of manufacture, a fastener for laminated cores of electrical apparatus, said fastener comprising a magnetizable metallic body portion coated with a rust-proofing material comprising a molecule including atoms of the magnetizable metal, said coating being an insulator of electricity.

8. An article of manufacture comprising a fastener for laminations of cores for electrical apparatus, said fastener comprising a tubular member provided with an open seam and coated with insulating material.

9. An article of manufacture comprising a fastener for laminations of a laminated core for electrical apparatus, said fastener comprising an iron tubular member having an open seam and coated with insulating material comprising a chemical combination of iron and an oxidizer.

10. An article of manufacture comprising a fastener for laminations of a laminated core for electrical apparatus comprising an iron member having a surface thereof treated to comprise phosphates of iron.

11. An article of manufacture comprising a fastener for laminations of laminated cores for electrical apparatus comprising an iron fastener having a "parkerized" surface.

12. A core for electrical apparatus comprising a plurality of superimposed sheets of iron having the surfaces thereof coated with iron oxide and with through fasteners passing through said sheets, said fasteners comprising iron members having "parkerized" surfaces.

13. A laminated core for electrical apparatus comprising superimposed sheets of magnetizable material provided with openings, fasteners extending through said openings and "parkerized" surfaces between the laminations of the core and said fasteners.

WILLIAM J. O'LEARY.